(12) United States Patent
Riha et al.

(10) Patent No.: US 7,735,530 B1
(45) Date of Patent: Jun. 15, 2010

(54) ROTARY DANGLE HEAD HAVING CONTINUOUS ROTATION

(75) Inventors: Gary D. Riha, Green Bay, WI (US); Donald A. Dubey, Columbia, SC (US)

(73) Assignee: Puma, LLC, Minneapolis, MN (US)

( * ) Notice: Subject to any disclaimer, the term of this patent is extended or adjusted under 35 U.S.C. 154(b) by 873 days.

(21) Appl. No.: 11/584,655

(22) Filed: Oct. 20, 2006

(51) Int. Cl.
*A01G 23/08* (2006.01)
*B66C 1/00* (2006.01)

(52) U.S. Cl. .................. 144/4.1; 144/34.1; 414/738

(58) Field of Classification Search .................. 144/4.1, 144/34.1, 34.5; 414/626, 738–741; 294/86.41, 294/88
See application file for complete search history.

(56) References Cited

U.S. PATENT DOCUMENTS

| | | | | |
|---|---|---|---|---|
| 3,369,672 A | * | 2/1968 | Lorence | 212/247 |
| 3,796,242 A | * | 3/1974 | Albright | 144/34.1 |
| 4,043,210 A | * | 8/1977 | Updegrave | 475/346 |
| 4,426,110 A | * | 1/1984 | Mitchell et al. | 294/88 |
| 7,152,519 B2 | * | 12/2006 | Dubreuil | 92/106 |

* cited by examiner

*Primary Examiner*—Shelley Self
(74) *Attorney, Agent, or Firm*—Donald J. Ersler

(57) ABSTRACT

A rotary dangle head having continuous rotation includes a rotator, a continuous rotary hydraulic union and a dangle head. The rotator includes a support base, a slewing ring, a mounting plate and a ring rotator. The slewing ring includes an outer bearing ring and an inner bearing ring. The dangle head includes a retention bracket and a processing head. The processing head is pivotally retained by the retention bracket. The outer bearing ring is attached to a bottom of the support base. The inner bearing ring is attached to a top of the mounting plate. The ring rotator drives the outer bearing ring. The retention plate is attached to a bottom of the mounting plate. The continuous rotary hydraulic union is connected to hydraulically driven components mounted to the processing head.

18 Claims, 6 Drawing Sheets

ROTARY DANGLE HEAD HAVING CONTINUOUS ROTATION

BACKGROUND OF THE INVENTION

1. Field of the Invention

The present invention relates generally to tree processing and harvesting and more specifically to a rotary dangle head having continuous rotation, which does not require an operator to reverse rotation of a dangle head relative to a logging equipment boom.

2. Discussion of the Prior Art

It appears that the prior art does not disclose a rotary dangle head with continuous rotation relative to a logging equipment boom. Continuous rotary hydraulic unions are used for other equipment. However, it appears the continuous rotary hydraulic unions have not been used for rotary dangle heads. Most rotary dangle heads are capable of rotating nearly 360 degrees relative to logging equipment booms. However, the prior art rotary dangle heads have a couple of drawbacks. First, hydraulic hoses are being twisted and stressed every time the dangle head is rotated. As a result, the hydraulic hoses must be replaced periodically. Secondly, an operator must frequently reverse rotation of the dangle head to complete a tree moving operation. If the operator picks-up a tree with a prior art rotator, after a 350 degree rotation from a starting angle and the operator is required to rotate the tree an addition 30 degrees in the same direction; the prior art rotator requires the operator to reverse rotation 340 degrees to get to the desired angle of rotation.

Accordingly, there is a clearly felt need in the art for a rotary dangle head having a continuous rotation, which does not require an operator to reverse rotation of a dangle head relative to a logging equipment boom and does not wear hydraulic hoses during use.

SUMMARY OF THE INVENTION

The present invention provides a rotary dangle head having continuous rotation, which does not wear hydraulic hoses during use. The rotary dangle head having continuous rotation (rotary dangle head) includes a rotator, a continuous rotary hydraulic union and a dangle head. The rotator includes a support base, a slewing ring, a dangle head mounting plate and a ring rotator. The support base includes a support plate and at least two upright plates which extend upward from the support plate. A boom pin is inserted through a bore formed through a top of the at least two upright plates and an end of the logging equipment boom. The slewing ring includes an outer bearing ring and an inner bearing ring. An outer gear is formed on the outer diameter of the outer bearing ring. The slewing ring is well known in the art and may be purchased as an assembled part. The slewing ring is retained between the dangle head mounting plate and the support plate.

The dangle head includes a retention bracket, a processing head and at least one actuator. The processing head is pivotally retained by the retention bracket. One end of each actuator is attached to the processing head and the other end is attached to the retention bracket.

The outer bearing ring is attached to a bottom of the support plate. The inner bearing ring is attached to a top of the dangle head mounting plate. The ring rotator is attached to a bottom of the dangle head mounting plate. A drive gear extends from a drive shaft of the ring rotator. The drive gear is sized to rotate the outer bearing ring. The retention bracket is attached to a bottom of the dangle head mounting plate. A top of the continuous rotary hydraulic union is preferably attached to a top of the support plate. The continuous rotary hydraulic union extends through an opening in the dangle head mounting plate. The continuous rotary hydraulic union includes a plurality of hydraulic fittings for connecting hydraulic hoses to hydraulically driven components, such as the at least one actuator, a roller motor and a chain saw.

Accordingly, it is an object of the present invention to provide a rotary dangle head, which does not require an operator to reverse rotation of a dangle head relative to a logging equipment boom.

Finally, it is another object of the present invention to provide a rotary dangle head, which does not wear hydraulic hoses during use.

These and additional objects, advantages, features and benefits of the present invention will become apparent from the following specification.

DETAILED DESCRIPTION OF THE PREFERRED EMBODIMENTS

Figure 1:
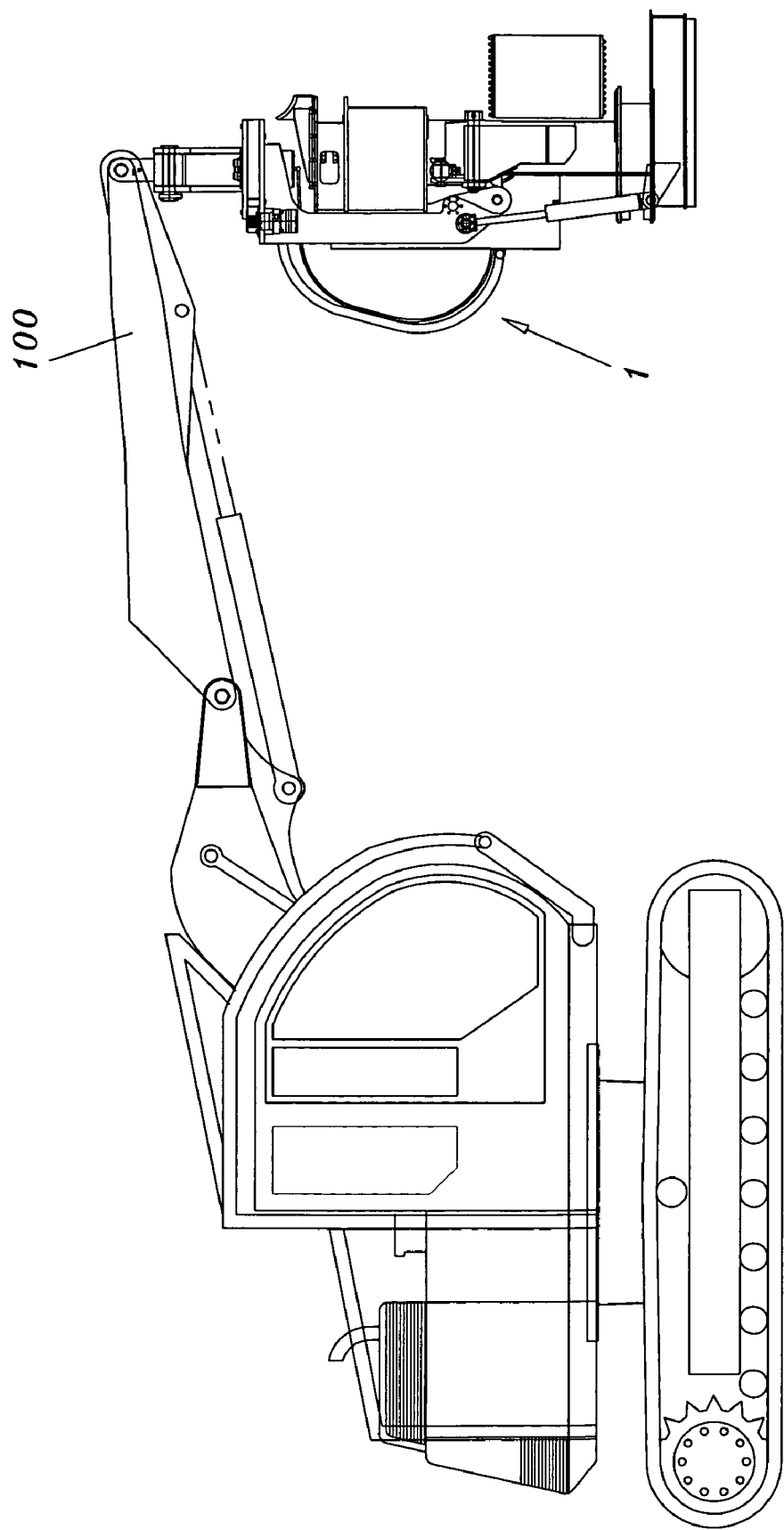
FIG. 1 is a side view of a logging equipment boom of an excavator retaining a rotary dangle head in accordance with the present invention.
Figure 2:
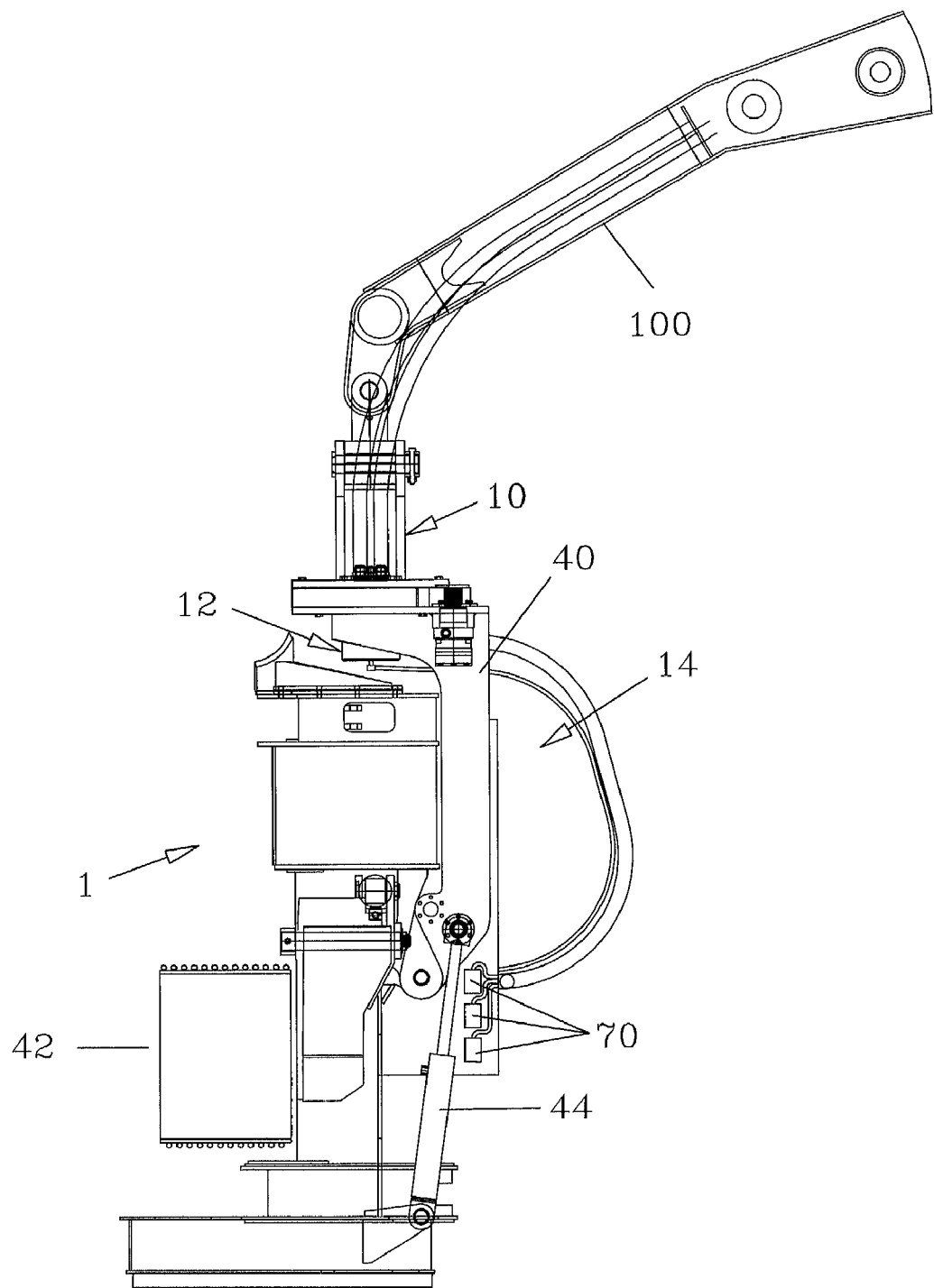
FIG. 2 is a side view of a logging equipment boom retaining a rotary dangle head in accordance with the present invention.
Figure 3:
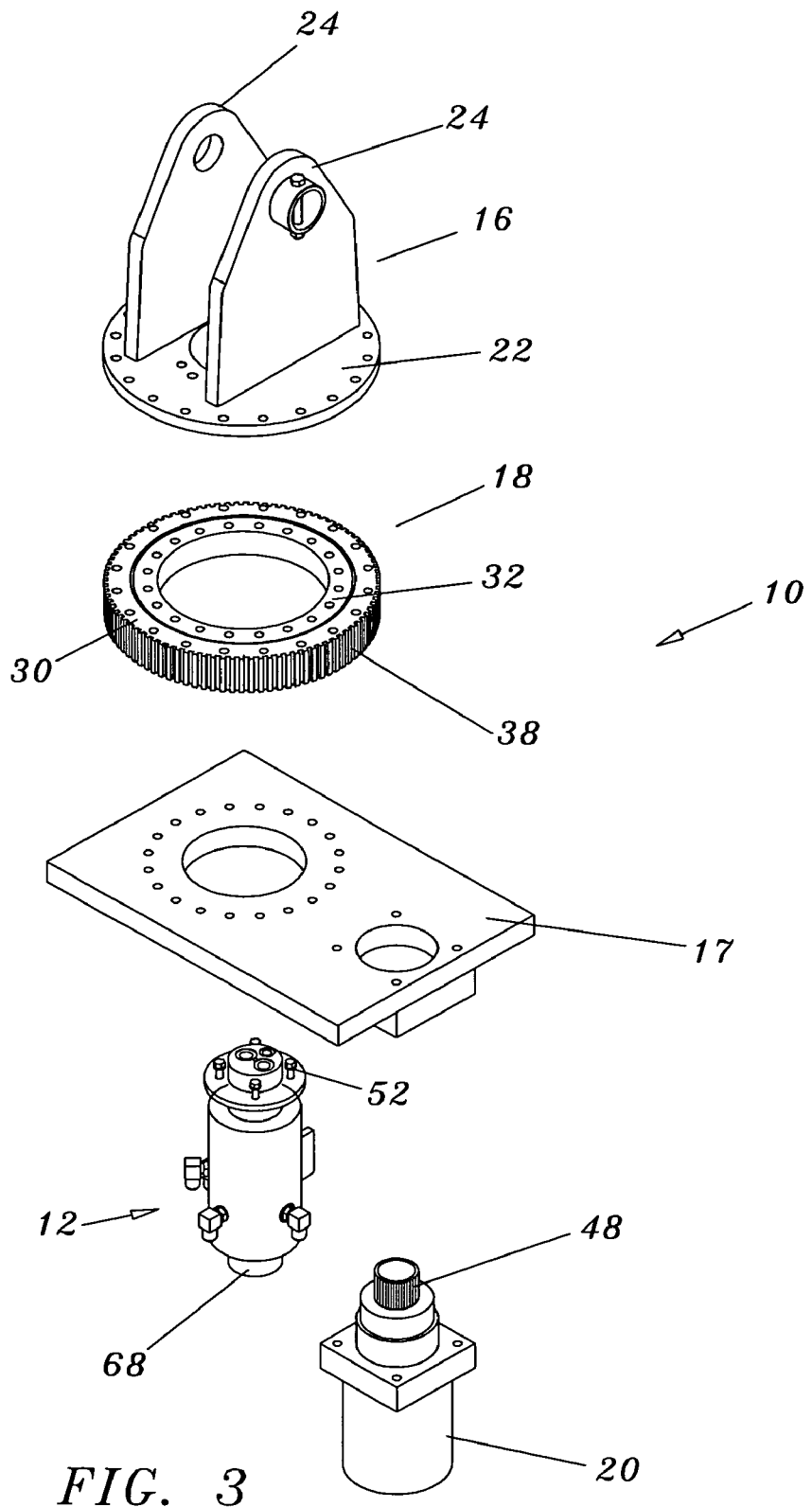
FIG. 3 is an exploded perspective view of a rotator and a continuous rotary hydraulic union of a rotary dangle head in accordance with the present invention.
Figure 4:
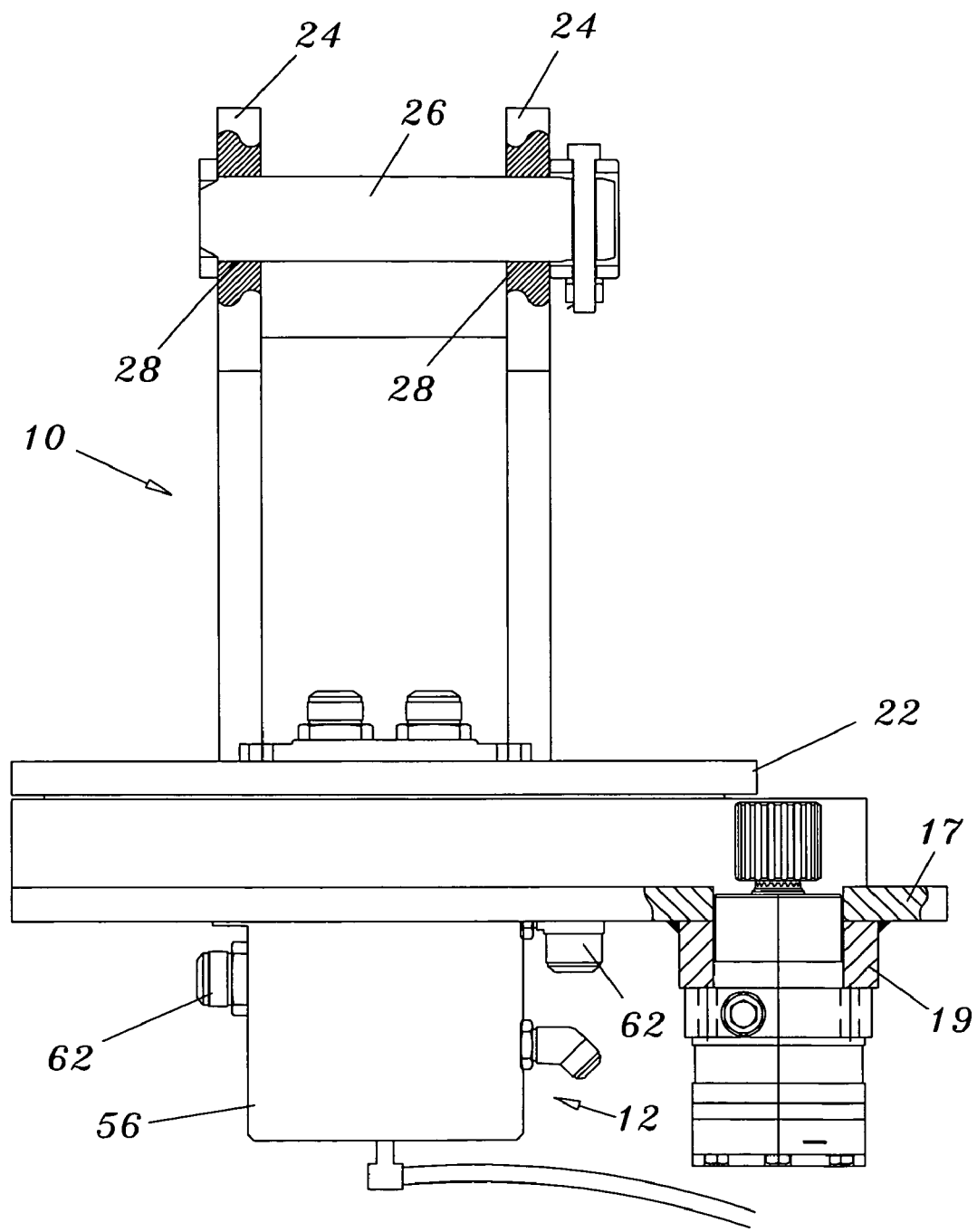
FIG. 4 is a front view of a rotator and a continuous rotary hydraulic union of a rotary dangle head in accordance with the present invention.
Figure 5:
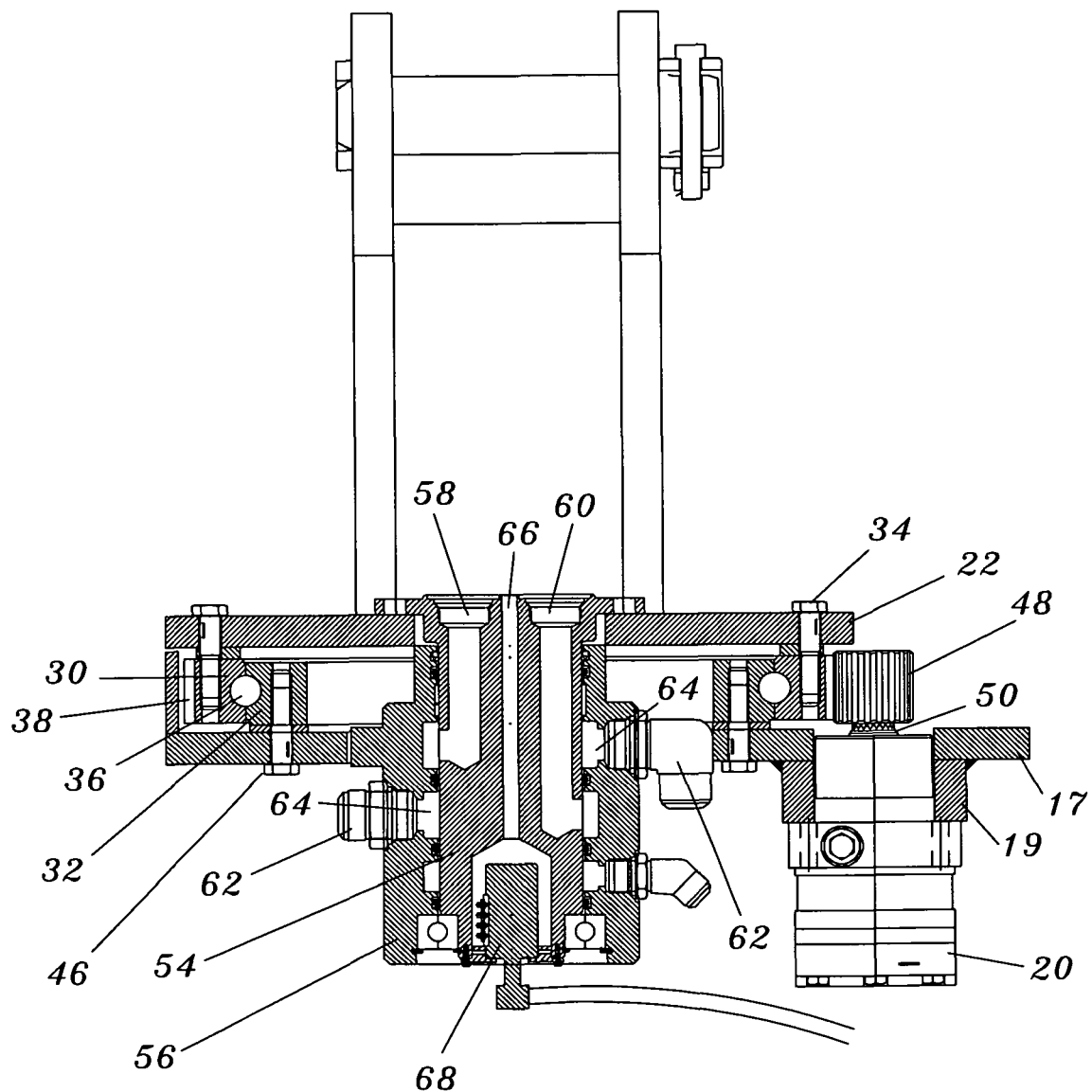
FIG. 5 is a front partial cross sectional view of a rotator and a continuous rotary hydraulic union of a rotary dangle head in accordance with the present invention.

With reference now to the drawings, and particularly to FIG. 1, there is shown a side view of a logging equipment boom 100 of an excavator retaining a rotary dangle head 1. With reference to FIG. 2, the rotary dangle head 1 includes a rotator 10, a continuous rotary hydraulic union 12 and a dangle head 14. With reference to FIGS. 3 and 5, the rotator 10 includes a support base 16, a slewing ring 18, a dangle head mounting plate 17 and a ring rotator 20. The support base 16 includes a support plate 22 and at least two upright plates 24. The at least two upright plates 24 are preferably welded to a top of the support plate 22, but could be attached with fasteners. With reference to FIG. 4, a boom pin 26 is inserted through a bore 28 formed through a top of the at least two upright plates 24 and an end of the logging equipment boom 100.

The slewing ring 18 includes an outer bearing ring 30 and an inner bearing ring 32. The outer bearing ring 30 is attached to a bottom of the support plate 22 with a plurality of fasteners 34. The outer bearing ring 30 is axially retained relative to the inner bearing ring 32 with a plurality of ball bearings 36. An outer gear 38 is formed on an outer diameter of the outer bearing ring 30. The inner bearing ring 32 is attached to a top of the dangle head mounting plate 17 with a plurality of fasteners 46. Slewing rings are well known in the art and need not be explained in detail, because the slewing ring may be purchased as an assembled part.

The dangle head 14 includes a retention bracket 40, a processing head 42 and at least one actuator 44. The retention bracket 40 is preferably attached to a bottom of the dangle head mounting bracket 17 with fasteners (not shown). The processing head 42 is pivotally retained by the retention bracket 40. Processing heads are well known in the art and need not be explained in further detail. One end of each actuator 44 is pivotally attached to the processing head 42 and the other end is pivotally attached to the retention bracket 40.

Figure 6:
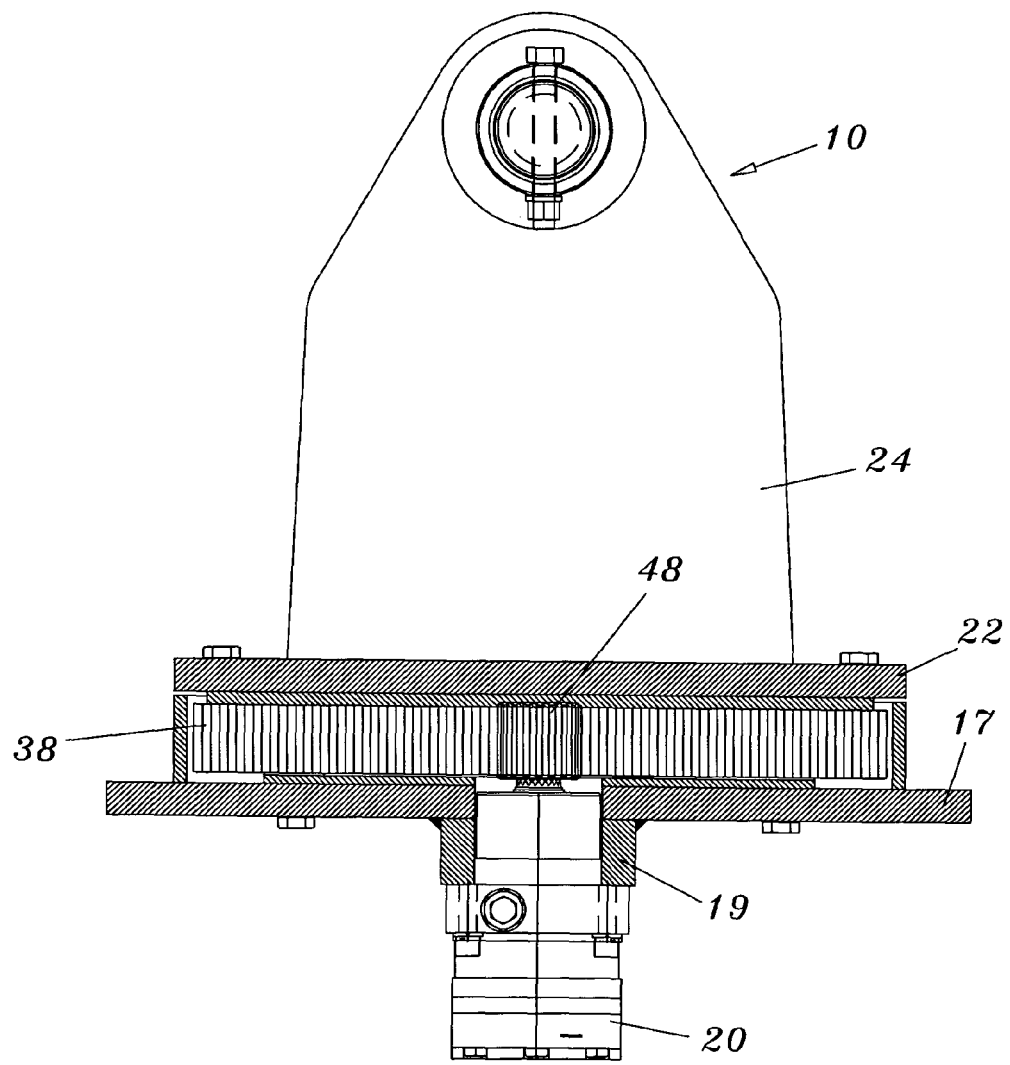
FIG. 6 is a side partial cross sectional view of a rotator of a rotary dangle head in accordance with the present invention.

With reference to FIG. 6, a rotator boss 19 is preferably welded to a bottom of the dangle head mounting plate 17. The ring rotator 20 is attached to a bottom of the dangle head mounting plate 17 with a plurality of fasteners (not shown). The ring rotator 20 is preferably a hydraulic motor, but could be an electric motor. A drive gear 48 extends from a drive shaft 50 of the ring rotator 20. The drive gear 48 is sized to mate with the outer gear 38 and rotate the dangle head mounting plate 17 relative to the support plate 22. A top of the continuous rotary hydraulic union 12 is attached to a top of the support plate 22 with a plurality of fasteners 52. The continuous rotary hydraulic union 12 extends through an opening in the dangle head mounting plate 17.

The continuous rotary hydraulic union 12 includes a stationary portion 54 and a rotary portion 56. An inlet passage 58 and an outlet passage 60 are formed in the stationary portion 54. The inlet and outlet passages communicate with a plurality of hydraulic fittings 62 threaded into hydraulic passages 64 formed in the rotary portion 56. The plurality of hydraulic fittings 62 are connected to hydraulic hoses for powering hydraulically driven components, such as the at least one actuator 44, a roller motor and a chain saw. The flow of hydraulic fluid to the hydraulically driven components is controlled by a plurality of electrically operated valves 70.

An electrical line bore 66 is formed through a center of the continuous rotary hydraulic union 12 to allow at least one electrical line to be connected to a rotary electrical connector 68. The rotary electrical connector 68 is attached to a bottom of the continuous rotary hydraulic union 12 with fasteners or the like. The rotary electrical connector 68 provides electrical power to a plurality of electrical components mounted to the processing head 42.

The processing head 42 may have the function of grabbing a tree, cutting the tree off and delimbining the tree, or the processing head 42 may have the function of grabbing a tree and cutting the tree off.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A rotary dangle head having continuous rotation comprising:
    a dangle head having a retention bracket and a processing head, said processing head being pivotally retained by said retention bracket;
    a rotator being mounted to a top of said retention bracket, means for rotating said retention bracket continuously relative to said rotator;
    a rotary hydraulic union provides at least one hydraulic driven component with a flow of hydraulic fluid from a source of hydraulic fluid; and
    a rotary electrical connector being attached to a bottom of said rotary hydraulic union for providing electrical power to at least one electrical device, said at least one electrical device controls the flow of hydraulic fluid to said at least one hydraulic driven component, said at least one electrical device rotates with said dangle head.

2. The rotary dangle head having continuous rotation of claim 1, further comprising:
    a slewing ring being retained in said rotator.

3. The rotary dangle head having continuous rotation of claim 2, further comprising:
    said slewing ring having an outer bearing ring and an inner bearing ring, forming an outer gear on said outer bearing ring, said outer gear being rotated by said means for rotating said retention bracket.

4. The rotary dangle head having continuous rotation of claim 1, further comprising:
    providing a motor for said means for rotating said retention bracket.

5. The rotary dangle head having continuous rotation of claim 1, wherein:
    a top of said rotator being pivotally retained by an end of a logging equipment boom.

6. The rotary dangle head having continuous rotation of claim 1, further comprising:
    at least two hydraulic lines being connected between said rotary hydraulic union and said at least one hydraulic driven component.

7. A rotary dangle head having continuous rotation comprising:
    a dangle head having a retention bracket and a processing head, said processing head being pivotally retained by said retention bracket;
    a rotator being mounted to a top of said retention bracket, means for rotating said retention bracket continuously relative to said rotator;
    a rotary hydraulic union provides at least one hydraulic driven component retained on said processing head with a flow of hydraulic fluid from a source of hydraulic fluid; and
    a rotary electrical connector being attached to a bottom of said rotary hydraulic union for providing electrical power to at least one electrical device, said at least one electrical device controls the flow of hydraulic fluid to said at least one hydraulic driven component, said at least one electrical device rotates with said dangle head.

8. The rotary dangle head having continuous rotation of claim 7, further comprising:
    a slewing ring being retained in said rotator.

9. The rotary dangle head having continuous rotation of claim 8, further comprising:
    said slewing ring having an outer bearing ring and an inner bearing ring, forming an outer gear on said outer bearing ring, said outer gear being rotated by said means for rotating said retention bracket.

10. The rotary dangle head having continuous rotation of claim 7, further comprising:
    providing a motor for said means for rotating said retention bracket.

11. The rotary dangle head having continuous rotation of claim 7, wherein:
    a top of said rotator being pivotally retained by an end of a logging equipment boom.

12. The rotary dangle head having continuous rotation of claim 7, further comprising:
    at least two hydraulic lines being connected between said rotary hydraulic union and said at least one hydraulic driven component.

13. A rotary dangle head having continuous rotation comprising:

a dangle head having a retention bracket and a processing head, said processing head being pivotally retained by said retention bracket;

a rotator including a support base, a slewing ring, and a mounting plate and means for rotating said slewing ring, said slewing ring being retained between a bottom of said support base and said mounting plate, attaching the retention bracket to a bottom of said mounting plate, said retention bracket being rotated relative to said support base by said means for rotating said slewing ring;

a rotary hydraulic union being retained by said support base, said rotary hydraulic union provides at least one hydraulic driven component with a flow hydraulic fluid from a source of hydraulic fluid; and a rotary electrical connector being attached to a bottom of said rotary hydraulic union for providing electrical power to at least one electrical device, said at least one electrical device controls the flow of hydraulic fluid to said at least one hydraulic driven component, said at least one electrical device rotates with said dangle head.

14. The rotary dangle head having continuous rotation of claim 13, further comprising:

said slewing ring having an outer bearing ring and an inner bearing ring, forming an outer gear on said outer bearing ring, said outer gear being rotated by said means for rotating said slewing ring.

15. The rotary dangle head having continuous rotation of claim 13, further comprising:

providing a motor for said means for rotating said slewing ring.

16. The rotary dangle head having continuous rotation of claim 13, wherein:

a top of said rotator being pivotally retained by an end of a logging equipment boom.

17. The rotary dangle head having continuous rotation of claim 13, further comprising:

a rotary electrical connector being attached to a bottom of said rotary hydraulic union for providing electrical power to at least one electrical device mounted to the processing head.

18. The rotary dangle head having continuous rotation of claim 13, further comprising:

at least two hydraulic lines being connected between said rotary hydraulic union and said at least one hydraulic driven component.

* * * * *